United States Patent
De Beer et al.

(10) Patent No.: US 10,023,354 B2
(45) Date of Patent: *Jul. 17, 2018

(54) PALLET WITH EXTRUDED COMPOSITE SUPPORT BLOCKS AND ASSOCIATED METHODS OF MAKING THE SAME

(71) Applicant: CHEP Technology Pty Limited, Sydney, NSW (AU)

(72) Inventors: Sarel Johannes De Beer, Alberton (ZA); Kenneth Brandt, Orlando, FL (US); Matthew Wood, Orlando, FL (US)

(73) Assignee: CHEP Technology Pty Limited, Sydney (AU)

(*) Notice: Subject to any disclaimer, the term of this patent is extended or adjusted under 35 U.S.C. 154(b) by 0 days.

This patent is subject to a terminal disclaimer.

(21) Appl. No.: 15/687,829

(22) Filed: Aug. 28, 2017

(65) Prior Publication Data

US 2017/0355488 A1    Dec. 14, 2017

Related U.S. Application Data

(63) Continuation of application No. 14/989,011, filed on Jan. 6, 2016, now Pat. No. 9,776,762.

(51) Int. Cl.
*B65D 19/38*    (2006.01)
*B65D 19/00*    (2006.01)
(Continued)

(52) U.S. Cl.
CPC ......... *B65D 19/38* (2013.01); *B65D 19/0091* (2013.01); *B65D 19/0095* (2013.01); *B29C 47/0004* (2013.01); *B29C 47/0023* (2013.01); *B29K 2101/12* (2013.01); *B29K 2601/00* (2013.01); *B65D 2519/00029* (2013.01); *B65D 2519/00039* (2013.01); *B65D 2519/00064* (2013.01); *B65D 2519/00109* (2013.01); *B65D 2519/00134* (2013.01);
(Continued)

(58) Field of Classification Search
CPC .......... B65D 2519/00034; B65D 2519/00084; B65D 2519/00019; B65D 2519/00054; B65D 2519/00089; B65D 2519/00124; B65D 2519/00358; B65D 2519/00388; B65D 2519/00562; B65D 19/38; B65D 19/00; B65D 19/20
USPC ... 108/57.25, 51.11, 51.3, 57.19, 57.2, 57.22
See application file for complete search history.

(56) References Cited

U.S. PATENT DOCUMENTS 2,798,685 A * 7/1957 Mooney ............. B65D 19/0028
108/51.3
3,007,663 A * 11/1961 Huck ................. B65D 19/0012
108/51.3
(Continued)

FOREIGN PATENT DOCUMENTS

TW           286187       1/2006
WO         2013120595     8/2013

*Primary Examiner* — Jose V Chen
(74) *Attorney, Agent, or Firm* — Allen, Dyer, Doppelt & Gilchrist, P.A.

(57) ABSTRACT

A pallet includes a cargo layer and a base layer, and a plurality of support block assemblies separating the cargo and base layers. Each support block assembly includes a first support block with a first opening extending therethrough in a horizontal direction, and a second support block inserted into the first opening of the first support block.

20 Claims, 8 Drawing Sheets

(51) Int. Cl.
*B29C 47/00* (2006.01)
*B29K 101/12* (2006.01)
*B29K 601/00* (2006.01)

(52) U.S. Cl.
CPC ............. *B65D 2519/00139* (2013.01); *B65D 2519/00144* (2013.01); *B65D 2519/00273* (2013.01); *B65D 2519/00293* (2013.01); *B65D 2519/00323* (2013.01); *B65D 2519/00343* (2013.01); *B65D 2519/00373* (2013.01); *B65D 2519/00432* (2013.01); *B65D 2519/00572* (2013.01)

(56) References Cited

U.S. PATENT DOCUMENTS

| | | | | |
|---|---|---|---|---|
| 3,165,078 A | * | 1/1965 | White | B65D 19/0095 108/51.3 |
| 3,407,758 A | | 10/1968 | Simkins | |
| 3,659,534 A | * | 5/1972 | Childs | B65D 19/0012 108/51.3 |
| 3,675,345 A | * | 7/1972 | Abrams | A63H 33/04 108/51.3 |
| 3,881,429 A | | 5/1975 | Seymore | |
| 4,649,007 A | * | 3/1987 | Bonis | B29C 47/0021 108/57.25 |
| 4,790,249 A | * | 12/1988 | Webb | B65D 19/0012 108/51.3 |
| 4,966,084 A | | 10/1990 | Motomaru | |
| 5,463,965 A | * | 11/1995 | Cordrey | B31F 1/20 108/51.3 |
| 5,531,166 A | * | 7/1996 | Woods | B65D 71/0092 108/51.3 |
| 5,537,935 A | * | 7/1996 | Otaguchi | B65D 19/0012 108/51.3 |
| 6,079,337 A | | 6/2000 | Huang et al. | |
| 6,216,608 B1 | * | 4/2001 | Woods | B65D 19/0012 108/56.1 |
| 6,394,003 B1 | * | 5/2002 | Lacy, III | B65D 19/02 108/51.3 |
| 6,524,426 B1 | * | 2/2003 | St. John | B29C 66/91231 108/51.11 |
| 6,955,129 B2 | | 10/2005 | Moore, Jr. et al. | |
| 7,086,338 B2 | * | 8/2006 | Horiuchi | B65D 19/0012 108/51.3 |
| 7,308,857 B2 | | 12/2007 | Moore, Jr. et al. | |
| 7,779,765 B2 | | 8/2010 | Donnell, Jr. et al. | |
| 7,987,798 B2 | | 8/2011 | Kim | |
| 8,567,324 B1 | * | 10/2013 | Paradis | B65D 19/0012 108/51.3 |
| 8,887,646 B2 | | 11/2014 | Skudutis et al. | |
| 9,038,273 B2 | | 5/2015 | Grgac et al. | |
| 9,038,547 B2 | * | 5/2015 | Whiteford | B65D 19/0095 108/57.25 |
| 9,776,762 B2 | * | 10/2017 | De Beer | B65D 19/38 |
| 2003/0183133 A1 | * | 10/2003 | Dehennau | B65D 19/0012 108/57.25 |
| 2004/0221771 A1 | | 11/2004 | Moore, Jr. et al. | |
| 2005/0056193 A1 | * | 3/2005 | Laender | B65D 19/0081 108/56.3 |
| 2005/0103237 A1 | | 5/2005 | Moore, Jr. et al. | |
| 2005/0145143 A1 | * | 7/2005 | Moore, Jr. | B65D 19/0012 108/51.3 |
| 2007/0017422 A1 | | 1/2007 | Ingham | |
| 2007/0017423 A1 | * | 1/2007 | Ingham | B65D 19/0048 108/57.17 |
| 2010/0107933 A1 | * | 5/2010 | Love | B65D 19/0022 108/51.3 |
| 2011/0192326 A1 | | 8/2011 | Ingham | |

* cited by examiner

PALLET WITH EXTRUDED COMPOSITE SUPPORT BLOCKS AND ASSOCIATED METHODS OF MAKING THE SAME

RELATED APPLICATION

This application is a continuation of U.S. patent application Ser. No. 14/989,011 filed Jan. 6, 2016, the entire contents of which is incorporated herein by reference.

FIELD OF THE INVENTION

The present invention relates to the field of pallets, and more particularly, to a pallet with extruded composite support blocks, and related methods for making the same.

BACKGROUND OF THE INVENTION

Conventional pallets are typically made of wood and include a base layer and a cargo layer separated therefrom by support blocks. The base and cargo layers are also referred to as bottom and top decks.

Traditionally, the base and cargo layers are multiple layers, with each layer respectively having end deck boards assembled on connector boards that run the full length or width of the pallet. The end deck boards are nailed through the connector boards into the support blocks to build the primary structure of the pallet. The end deck boards are also known as lead boards. Intermediate deck boards are placed between the end deck boards. Alternatively, the base layer may be a single layer where the end deck boards do not overlap the connector boards.

To move the pallet with cargo thereon, tines from a forklift or a pallet jack are inserted into the gaps between the base and cargo layers on a lead board side of the pallet. In certain instances, the tines of the forklift or pallet jack may make contact with the support blocks during alignment. If the force is significant, the support blocks may be damaged.

The support blocks are generally solid wood. Solid wood support blocks provide good strength and durability. Depending on their size, solid wood support blocks can be heavy which adds to the final weight of the pallet. The cost of each solid wood support block is typically based on its volume and the type of wood used.

As an alternative to solid wood support blocks, composite materials may be used. U.S. published patent no. 2011/0192326 to Ingham discloses a pallet comprising a first deck, a second deck, and a plurality of support blocks connecting the first and second decks together to form a pallet. The support blocks include at least one recycled thermoplastic component including at least about 20% by weight of a recycled nylon carpet material.

Ingham discloses that the composite solid support blocks may have different shapes and geometries. To form the composite support blocks, compression molding, injection molding, or extrusion techniques may be used. Solid composite support blocks are not readily adaptable to extrusion due to the thickness of the composite material. If the composite material includes plastic, the plastic may get deformities if it does not cool well.

As an alternative to solid composite support blocks, Ingham further discloses a hollow composite support block with a substantially rectangular shaped top with rounded corner areas and a hollow center area. The thinner walls of the hollow support block cool faster when extruded. While the hollow composite support block has a reduced weight and volume as compared to a solid support block, it may not be strong enough to withstand heavy pallet loads because of the thinner walls. Consequently, there is a need for composite hollow support blocks that are lightweight while supporting heavy pallet loads.

SUMMARY OF THE INVENTION

A pallet includes a cargo layer, a base layer, and a plurality of support block assemblies separating the cargo and base layers. Each support block assembly may comprise a first support block with a first opening extending therethrough in a horizontal direction, and a second support block with a second opening extending therethrough in the horizontal direction. The second support block may be inserted into the first opening of the first support block. The support block assembly is a hollow structure which advantageously reduces weight and cost as compared to a single solid support block, yet still provides strength and durability to support heavy pallet loads.

The second opening in the second support block may be orthogonal with the first opening in the first support block so as to enclose the second opening. In this embodiment, exposed outer sidewalls of the second support block may be aligned with exposed outer sidewalls of the first support block. Interfaces between the exposed outer sidewalls of the first and second support blocks may be hermetically sealed. A hermetically sealed support block assembly prevents fasteners from being exposed within the second opening, as well as preventing dirt and water from accumulating within the second opening.

The pallet may further comprise a plurality of fasteners coupling the cargo and base layers to the plurality of support block assemblies, with the plurality of fasteners extending into the respective second openings of the second support blocks.

The first support block may be rectangular shaped and the first opening extending therethrough may also be rectangular shaped. The second support block may be rectangular shaped and the second opening extending therethrough may also be rectangular shaped.

The first and second support blocks may comprise a composite material. The composite material may comprise wood and plastic. The composite material may comprise about 50% wood and about 50% plastic, for example. The wood may comprise at least one of wood dust and wood waste, and the plastic may comprise recycled plastic. The cargo and base layers may each comprise a plurality of wood boards.

Another aspect is directed to a method for making a pallet comprising providing a cargo layer and a base layer, and forming a plurality of support block assemblies separating the cargo and base layers. Forming each support block assembly may comprise forming a first support block with a first opening extending therethrough in a horizontal direction, and forming a second support block with a second opening extending therethrough in the horizontal direction. The second support block may be inserted into the first opening of the first support block to form the support block assembly. The method may further comprise coupling the cargo and base layers to the plurality of support blocks. To form the first and second support blocks, extrusion techniques may advantageously be used.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
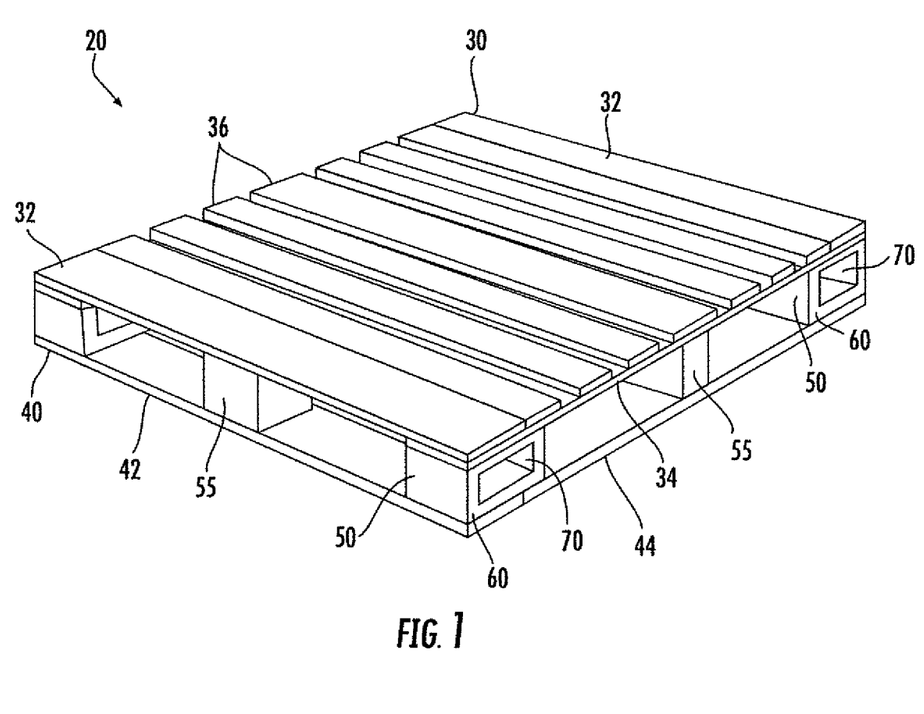
FIG. 1 is a perspective view of a pallet with extruded composite support block assemblies in accordance with the present invention.

Referring now to FIGS. 1-5, a pallet 20 with extruded composite support block assemblies 50 will be discussed. The pallet 20 includes a cargo layer 30, a base layer 40, and a plurality of support block assemblies 50 separating the cargo and base layers, as illustrated in FIG. 1. The support block assemblies 50 are at the corners of the pallet 20. Intermediate support blocks 55 are spaced between the between the support block assemblies 50.

Each support block assembly 50 includes a pair of hollow support blocks 60, 70, with one support block positioned inside the other support block. Each intermediate support block 55 is a single solid support block. Alternatively, each intermediate support block 55 may also be configured to include a pair of hollow support blocks.

The illustrated cargo layer 30 includes end deck boards 32 assembled on connector boards 34 that run the full length or width of the pallet 20. The end deck boards 32 are nailed through the connector boards 34 into the support block assemblies 50. The end deck boards 32 are also known as lead boards. Intermediate deck boards 36 are placed between the end deck boards 32. The illustrated base layer 40 includes end deck boards 42 that do not overlap the connector boards 44 so as to form a single layer.

The cargo and base layers 30, 40 are not limited to the illustrated embodiments, as readily appreciated by those skilled in the art. For example, the end deck boards 32 and the connector boards 34 in the cargo layer may not overlap so as to form a single layer. The boards in the cargo and base layers 30, 40 are typically wood.

Figure 2:
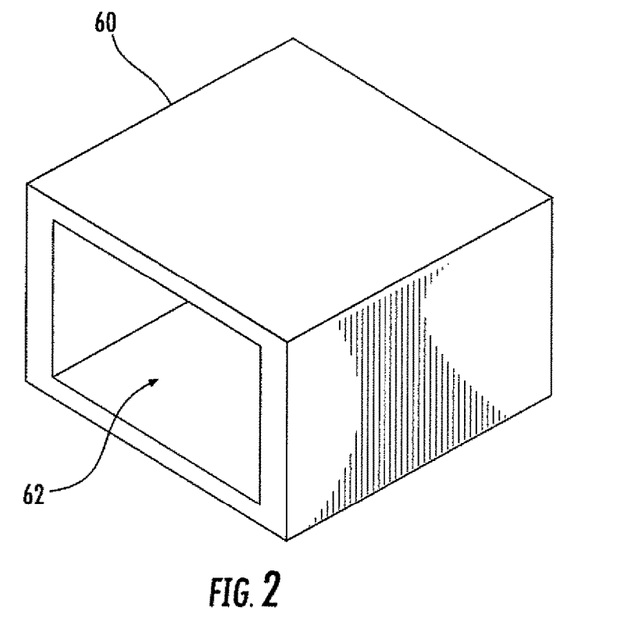
FIG. 2 is a perspective view of a first support block from the support block assembly illustrated in FIG. 1.
Figure 3:
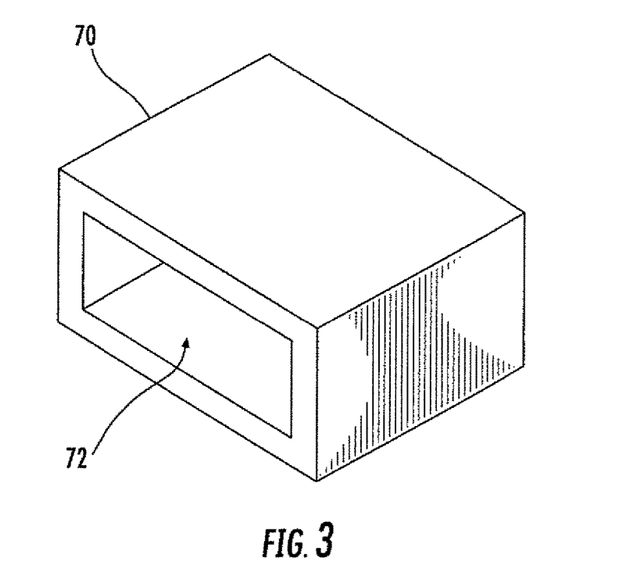
FIG. 3 is a perspective view of a second support block from the support block assembly illustrated in FIG. 1.

More particularly, each support block assembly 50 includes a first support block 60 with a first opening 62 extending therethrough, and a second support block 70 with a second opening 72 extending therethrough, as illustrated in FIGS. 2 and 3. The first opening 62 in the first support block 60 is aligned with the cargo and base layers 30, 40. Alignment means that the first support block 60 is orientated so that the first opening 62 extends in a horizontal direction. In other words, the first opening 62 extends in the same horizontal direction as the cargo and base layers 30, 40. Similarly, the second support block 70 is orientated so that the second opening 72 also extends in the horizontal direction.

Figure 4:
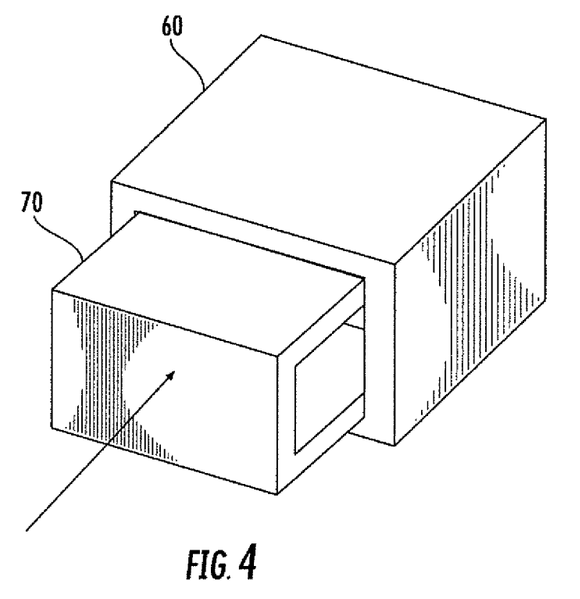
FIG. 4 is a perspective view of the second support block partially inserted into the first support block so as to form the support block assembly illustrated in FIG. 1.
Figure 5:
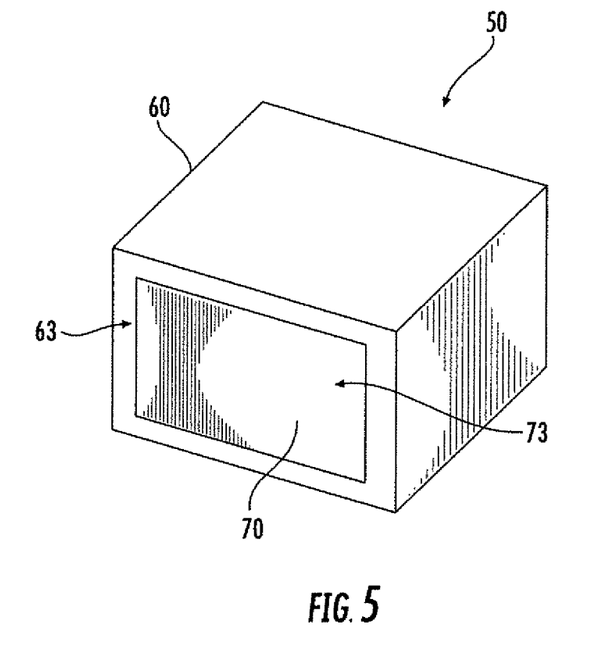
FIG. 5 is a perspective view of the support block assembly illustrated in FIG. 1.

The second support block 70 is then inserted into the first opening 62 of the first support block 60, as illustrated in FIG. 4. When fully inserted, the two support blocks 60, 70 thus form the support block assembly 50, as illustrated in FIG. 5. The support block assembly 50 is a hollow structure which reduces weight and cost as compared to a single solid support block, yet still provides strength and durability to support heavy pallet loads.

Still referring to FIG. 5, the second opening 72 in the second support block 70 is orthogonal with the first opening 62 in the first support block 60 so that the second opening is enclosed. In other words, the second support block 70 is rotated 90 degrees before being inserted into the first opening 62 in the first support block 60. This configuration of the support block assembly 50 provides a hollow yet fully enclosed support block assembly. The exposed outer sidewalls 73 of the second support block 70 are aligned with the exposed outer sidewalls 63 of the first support block 60.

Figure 6:
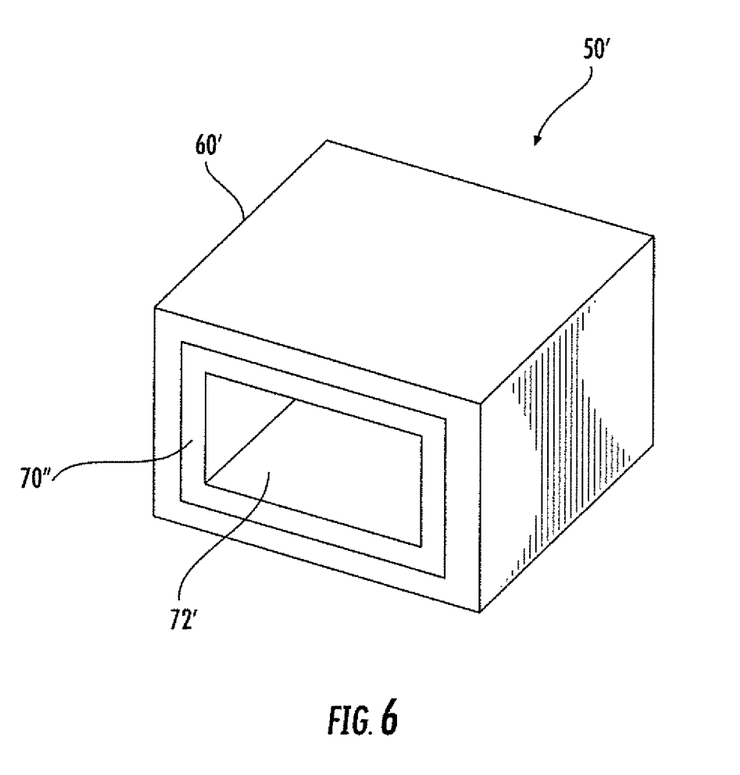
FIG. 6 is a perspective view of an alternative embodiment of the support block assembly illustrated in FIG. 5.

In an alternative embodiment of the support block assembly 50', orientation of the second support block 70' is the same as the first support block 60' so that when the second support block is inserted into the first support block, the second opening 72' is exposed, as illustrated in FIG. 6.

Figure 7:
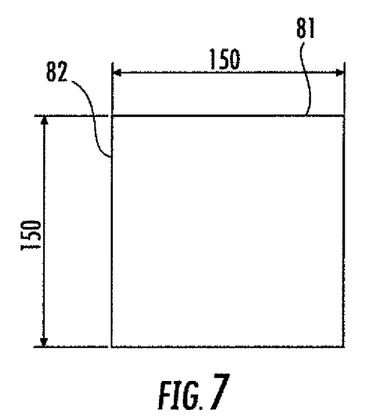
FIGS. 7-9 are top and side views with dimensions for the first support block illustrated in FIG. 2.
Figure 8:
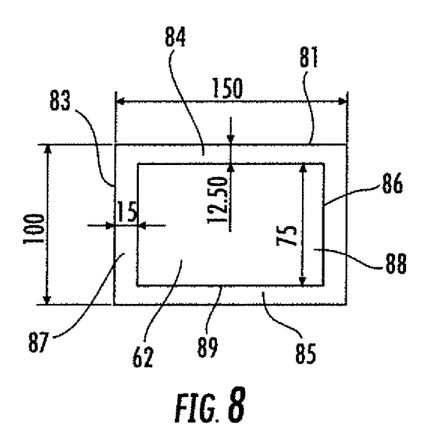
Figure 9:
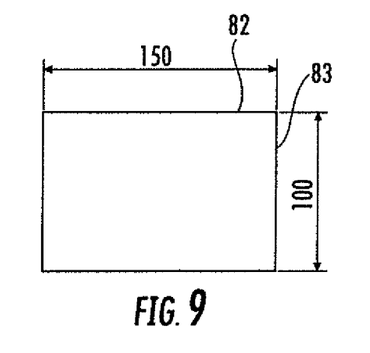

Referring now to FIGS. 7-9, example dimensions of the first support block 60 will be discussed. In a top view, the first support block 60 is 150 mm wide along edge 81 and 150 mm deep along edge 82. In a side view looking towards the first opening 62, a height of the first support block 60 is 100 mm along edge 83. A thickness of walls 84, 85 above and below the first opening 62 is 12.5 mm respectively so that a height of the first opening is 75 mm along edge 86. A thickness of walls 87, 88 to the left and right of the first opening 62 is 15 mm respectively so that a width of the first opening is 120 mm along edge 89.

Figure 10:
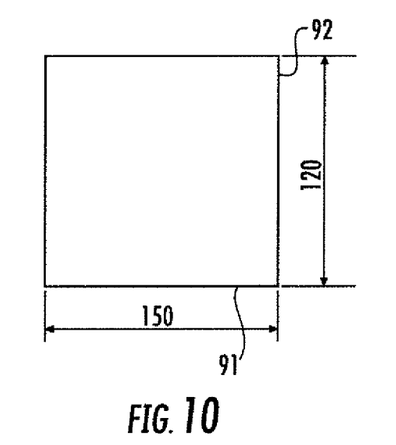
FIGS. 10-12 are top and side views with dimensions for the second support block illustrated in FIG. 3.
Figure 11:
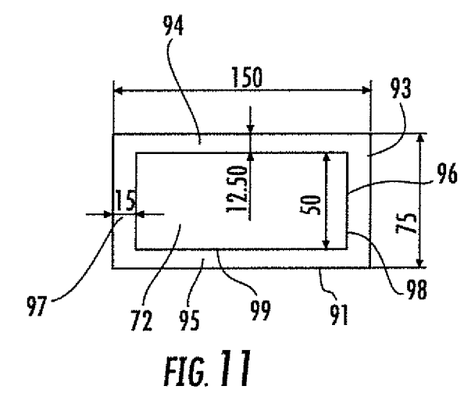
Figure 12:
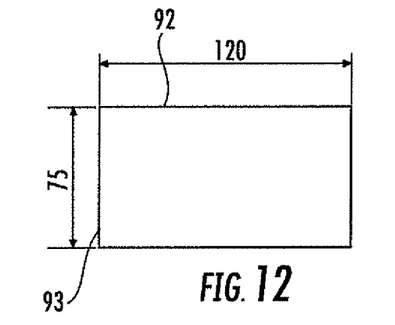

Referring now to FIGS. 10-12, example dimensions of the second support block 70 will be discussed. In a top view, the second support block 70 is 150 mm wide along edge 91 and 120 mm deep along edge 92. In a side view looking towards the second opening 72, a height of the second support block 70 is 75 mm along edge 93. A thickness of walls 94, 95 above and below the second opening 72 is 12.5 mm respectively so that a height of the second opening is 50 mm along edge 96. A thickness of walls 97, 98 to the left and right of the second opening 72 is 15 mm respectively so that a width of the second opening is 120 mm along edge 99.

The first and second support blocks 60, 70 are formed using a composite material. The composite material is a mixture of wood and plastic. More particularly, the wood includes wood dust and/or wood waste and the plastic includes, but is not limited to, plastic materials suitable for use in a high strength composite material for a pallet, such as thermoplastic polymers resistant to many chemical solvents, bases and acids.

Thermoplastic polymers include polypropylene, polyethylene, polyurethane, polyvinylchloride, and polyethylene terephthalate), for example. The plastic may be selected depending on the specific pallet design, load capacity, and other requirements. The plastic may be recycled plastic, virgin plastic, or mixtures thereof.

The composite mixture for the support blocks 60, 70 may vary between 40-60% wood and 60-40% recycled plastic. In one embodiment, the composite material includes 50% wood and 50% recycled plastic.

To form the composite support blocks 60, 70, compression molding, injection molding, or extrusion techniques may be used. Since the composite support blocks 60, 70 are hollow, extrusion is a preferred manufacturing technique since the "thin" walls of each support block cool within reasonable cycle times, as readily appreciated by those skilled in the art.

In addition, since the composite material includes plastic, heat may be used to seal off the outer exposed interfaces between the first and second support blocks 60, 70 so as to hermetically seal the second opening 72. This is done for the configuration where the second opening 72 in the second support block 70 is inserted orthogonal into the first opening 62 of the first support block 60. A hermetically sealed second opening 72 prevents the fasteners 100 from being exposed, as well as preventing dirt and water from accumulating within the second opening 72.

Figure 13:
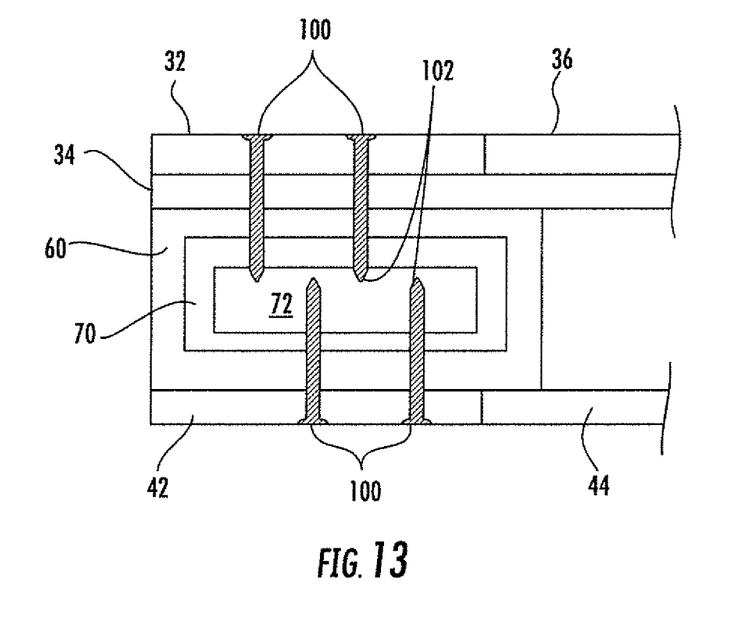
FIG. 13 is a partial cross-sectional view of a corner of the pallet illustrated in FIG. 1 with fasteners coupling the cargo and base layers to a support block assembly.

Referring now to FIG. 13, fasteners 100 are used to couple the boards in the cargo layer 30 to a top side of the support block assembly 50, and to couple the boards in the base layer 40 to a bottom side of the support block assembly 50. In the illustrated embodiment, the fasteners 100 are nails. Other types of fasteners may be used, such as screws, for example.

The fasteners 100 also hold the first and second support blocks 60, 70 in place. The fasteners 100 extend through both the first and second support blocks 60, 70. As a result, tips 102 of the fasteners are exposed within the second cavity 72. Another advantage of the first and second support blocks 60, 70 is that there is resiliency between the support block assembly 50 and the boards in the cargo and base layers 30, 40. If the tines from a forklift, for example, hit the end deck board 32 in the cargo layer 40, the impact force is transferred though the fasteners 100 to the support block assembly 50. Movement or shifting between the first and second support blocks 60, 70 help to absorb some of the impact.

Figure 14:
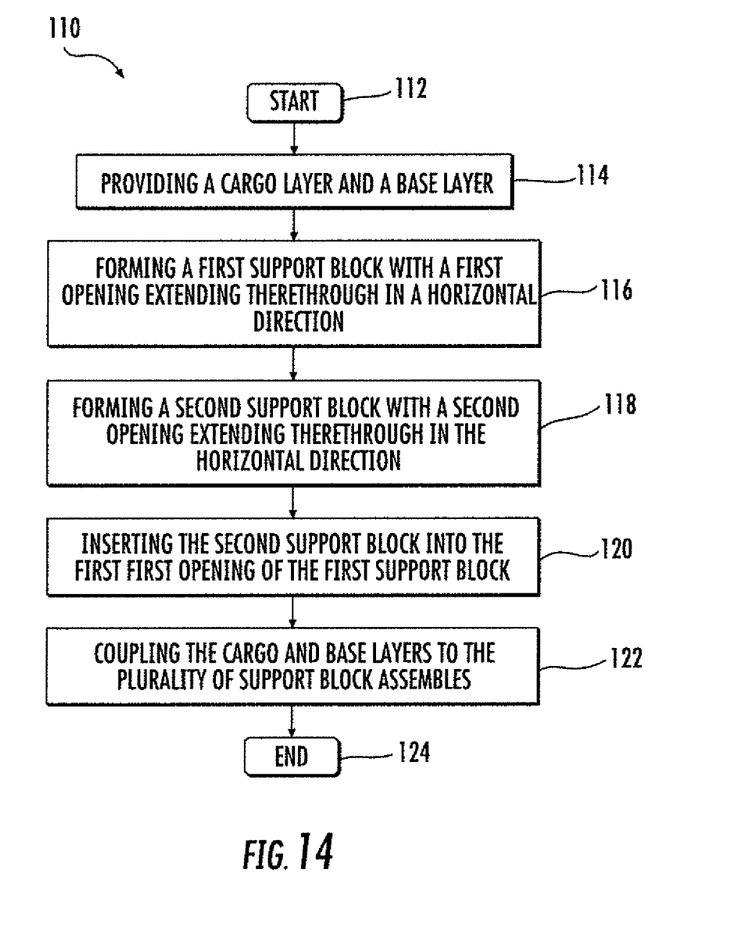
FIG. 14 is flowchart for making the pallet with extruded composite support block assemblies as illustrated in FIG. 1.

Another aspect is directed to a method for making a pallet 20 as described above. Referring now to the flowchart 110 illustrated in FIG. 14, from the start (Block 112), the method comprises providing a cargo layer 30 and a base layer 40 at Block 114. The method further comprises forming a first support block 60 with a first opening 62 extending therethrough in a horizontal direction at Block 116, and forming a second support block 70 with a second opening 72 extending therethrough in the horizontal direction at Block 118. The second support block 70 is inserted into the first opening 62 of the first support block 60 at Block 120 so as to form a support block assembly 50. The cargo and base layers 30, 40 are then coupled to a plurality of support block assemblies 50 at Block 122. The method ends at Block 124.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A pallet comprising:
a cargo layer;
a base layer; and
a plurality of support block assemblies separating said cargo and base layers, each support block assembly comprising
a first support block with a first opening extending therethrough in a horizontal direction, and
a second support block inserted into the first opening of said first support block, with the first opening in said first support block sized to receive only one second support block.

2. The pallet according to claim 1 wherein interior dimensions of each first support corresponds to exterior dimensions of each second support block.

3. The pallet according to claim 1 wherein exposed outer sidewalls of said second support block are aligned with exposed outer sidewalls of said first support block.

4. The pallet according to claim 1 wherein each second support block has a second opening extending therethrough in the horizontal direction.

5. The pallet according to claim 4 wherein the second opening in said second support block is orthogonal with the first opening in said first support block so as to enclose the second opening.

6. The pallet according to claim 5 wherein interfaces between the exposed outer sidewalls of said first and second support blocks are sealed.

7. The pallet according to claim 1 further comprising a plurality of fasteners coupling said cargo and base layers to said plurality of support block assemblies, with said plurality of fasteners extending into said second support blocks.

8. The pallet according to claim 1 wherein said first support block is rectangular shaped and the first opening extending therethrough is also rectangular shaped, and wherein said second support block is rectangular shaped.

9. The pallet according to claim 1 wherein said first and second support blocks comprise a composite material.

10. The pallet according to claim 9 wherein the composite material comprises wood and plastic.

11. The pallet according to claim 9 wherein the composite material comprises about 50% wood and about 50% plastic.

12. The pallet according to claim 10 wherein the wood comprises at least one of wood dust and wood waste, and wherein the plastic comprises recycled plastic.

13. The pallet according to claim 1 wherein said cargo and base layers each comprises a plurality of wooded boards.

14. A method for making support blocks for a pallet comprising a cargo layer and a base layer, with the support blocks being used to separate the cargo and base layers, the method comprising:
forming a first support block with a first opening extending therethrough in a horizontal direction;
forming a second support block; and
inserting the second support block into the first opening of the first support block, with the first opening in the first support block sized to receive only one second support block.

15. The method according to claim 14 wherein interior dimensions of each first support corresponds to exterior dimensions of each second support block.

16. The method according to claim 14 wherein exposed outer sidewalls of the second support block are aligned with exposed outer sidewalls of the first support block.

17. The method according to claim 14 wherein each second support block has a second opening extending therethrough in the horizontal direction.

18. The method according to claim 17 wherein the second opening in the second support block is orthogonal with the first opening in the first support block so as to enclose the second opening.

19. The method according to claim 18 wherein interfaces between the exposed outer sidewalls of the first and second support blocks are sealed.

20. The method according to claim 14 wherein the first support block is rectangular shaped and the first opening extending therethrough is also rectangular shaped, and wherein the second support block is rectangular shaped.

* * * * *